(12) United States Patent
Moritz

(10) Patent No.: US 8,167,471 B1
(45) Date of Patent: May 1, 2012

(54) SELF-ILLUMINATING EXTENSION CORD

(76) Inventor: Daniel Moritz, Lincoln Park, MI (US)

( * ) Notice: Subject to any disclaimer, the term of this patent is extended or adjusted under 35 U.S.C. 154(b) by 239 days.

(21) Appl. No.: 12/621,709

(22) Filed: Nov. 19, 2009

(51) Int. Cl.
*B29D 11/00* (2006.01)

(52) U.S. Cl. .......................... 362/582; 362/554

(58) Field of Classification Search ................ 362/554, 362/555, 582, 640, 511, 278, 551; 439/489–490, 439/910, 106
See application file for complete search history.

(56) References Cited

U.S. PATENT DOCUMENTS

| | | | |
|---|---|---|---|
| 1,935,771 A | 11/1933 | Feurstein et al. | |
| 3,942,859 A * | 3/1976 | Korodi | 439/490 |
| 4,101,190 A | 7/1978 | Schoff | |
| 4,307,925 A * | 12/1981 | Drew | 439/620.08 |
| 4,671,597 A * | 6/1987 | Grill | 362/253 |
| 4,984,999 A * | 1/1991 | Leake | 439/425 |
| 5,007,857 A * | 4/1991 | Wright | 439/490 |
| 5,167,535 A * | 12/1992 | Kovacik et al. | 439/620.08 |
| 5,207,594 A | 5/1993 | Olson | |
| D465,038 S | 10/2002 | Bragg et al. | |
| 6,710,254 B2 | 3/2004 | Yueh | |
| 6,921,286 B1 * | 7/2005 | Fernandez | 439/503 |
| 6,969,273 B2 | 11/2005 | Chen | |
| 7,121,707 B2 * | 10/2006 | Currie et al. | 362/555 |
| 2004/0105278 A1 * | 6/2004 | Currie et al. | 362/551 |
| 2008/0102689 A1 * | 5/2008 | Dhir | 439/490 |

\* cited by examiner

*Primary Examiner* — Julie Shallenberger
(74) *Attorney, Agent, or Firm* — Kyle Fletcher

(57) ABSTRACT

The self-illuminating extension cord consists of an extension cord including a plurality of lights adorning the exterior of said cord in a spiraling pattern that runs the entire length of the extension cord. The extension cord includes a male plug at a first end and a female plug at a second end. The lights provide an illuminating feature that alerts to the presence of said cord in poorly lit environments. An alternative embodiment further includes upon the male plug or female plug, a breaker, a pilot light, and a switch for turning the lights on or off. A third embodiment includes a translucent outer cover protecting both the plurality of lights and the extension cord.

11 Claims, 6 Drawing Sheets

SELF-ILLUMINATING EXTENSION CORD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of extension cords, more specifically, a self-illuminating extension cord.

B. Discussion of the Prior Art

As a preliminary note, it should be stated that there is an ample amount of prior art that deals with illuminated extension cords. As will be discussed immediately below, no prior art discloses an extension cord that includes a plurality of lights spiraling along the exterior surface of said extension cord in order to provide greater illumination of the extension cord.

The Olson Patent (U.S. Pat. No. 5,207,594) discloses an electrical power cord that has illumination features. However, the illumination features are directed to connecting bodies located at each end of the extension cord, as opposed to a plurality of lights that spiral the exterior surface along the length of the extension cord.

The Grill Patent (U.S. Pat. No. 4,671,597) discloses an electrical connector that has an integral light. However, the electrical connector does not involve an extension cord containing a plurality of lights running the length of the extension cord in a spiraling pattern.

The Fuerstein et al. Patent (U.S. Pat. No. 1,935,771) discloses a power cord for an appliance that has an integral light. However, the power cord includes a light adjacent where the cord plugs into an outlet, and does not include a plurality of lights adorning the exterior of said cord in a spiral pattern.

The Currie et al. Patent (U.S. Pat. No. 7,121,707) discloses an electrical cord assembly that has an illumination feature. However, the electrical cord assembly involving lights thereon requires the use of a translucent outer cover containing both the light(s) and the extension cord, and does not indicate a spiraling pattern.

The Yueh Patent (U.S. Pat. No. 6,710,254) discloses an electrical connection cord that has at least one illumination feature to indicate the location. However, the electrical connection cord does not depict or claim a plurality of lights adorning the exterior surface of said extension cord in a spiraling pattern.

The Schoff Patent (U.S. Pat. No. 4,101,190) discloses an indicator device that has an illumination feature that may be integral to its assembly as well as male and female connectors. However, the device is directed to only provide illumination for modular heating cables and does not double as an extension cord.

The Chen Patent (U.S. Pat. No. 6,969,273) discloses a computer connecting cable that has an integrated illumination assembly. However, the computer connecting cable does not function as an extension cord supplying electricity, or have a plurality of lights adorning the exterior surface of said cable in a spiraling pattern.

The Bragg et al. Patent (U.S. Pat. No. Des. 465,038) illustrates a design for an illumination apparatus, which does not depict an extension cord having a plurality of lights along the exterior surface of said extension cord, or arranging of said lights in a spiral pattern about the length of said extension cord.

While the above-described devices fulfill their respective and particular objects and requirements, they do not describe a self-illuminating extension cord that in addition to the function of an electrical extension cord includes a plurality of lights along a spiraling pattern along the external length of said extension cord for the purpose of providing illuminating means thereon. In this regard, the self-illuminating extension cord departs from the conventional concepts and designs of the prior art.

BRIEF SUMMARY OF THE INVENTION

The self-illuminating extension cord consists of an extension cord including a plurality of lights adorning the exterior of said cord in a spiraling pattern that runs the entire length of the extension cord. The extension cord includes a male plug at a first end and a female plug at a second end. The lights provide an illuminating feature that alerts to the presence of said cord in poorly lit environments. An alternative embodiment further includes upon the male plug or female plug, a breaker, a pilot light, and a switch for turning the lights on or off. A third embodiment includes a translucent outer cover protecting both the plurality of lights and the extension cord.

An object of the invention is to provide an extension cord having a self-illuminating means integrated thereon.

A further object of the invention is to provide a plurality of lights that run the entire length of the extension cord.

A further object of the invention is to provide a plurality of lights in a spiraling pattern along the exterior of said extension cord.

A further object of the invention is to provide a plurality of lighting means incorporated onto an extension cord and of which includes incandescent bulbs, light emitting diodes, or fiber optics.

A further object of the invention is to include versions including a breaker, an on/off switch, and a pilot light.

A further object of the invention is to include a version in which both the lights and the extension cord are encased inside a translucent outer protective layer.

These together with additional objects, features and advantages of the self-illuminating extension cord will be readily apparent to those of ordinary skill in the art upon reading the following detailed description of presently preferred, but nonetheless illustrative, embodiments of the self-illuminating extension cord when taken in conjunction with the accompanying drawings.

In this respect, before explaining the current embodiments of the self-illuminating extension cord in detail, it is to be understood that the self-illuminating extension cord is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the self-illuminating extension cord.

It is therefore important that the claims be regarded as including such equivalent construction insofar as they do not depart from the spirit and scope of the self-illuminating extension cord. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
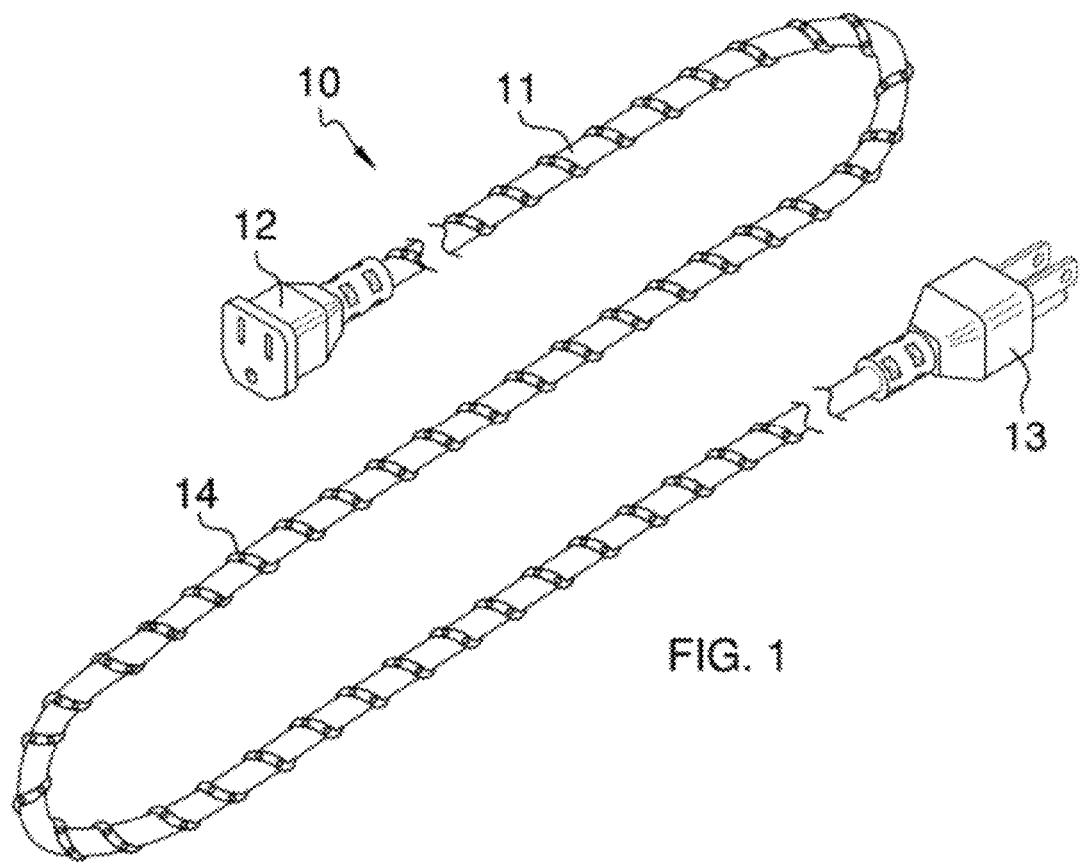
FIG. 1 illustrates an isometric view of the self-illuminating extension cord.
Figure 2:
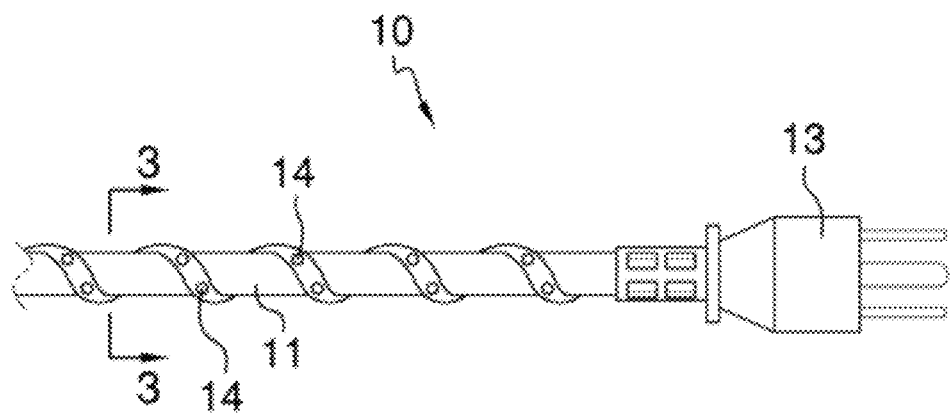
FIG. 2 illustrates a close up side view of the male plug of the self-illuminating extension cord.
Figure 3:
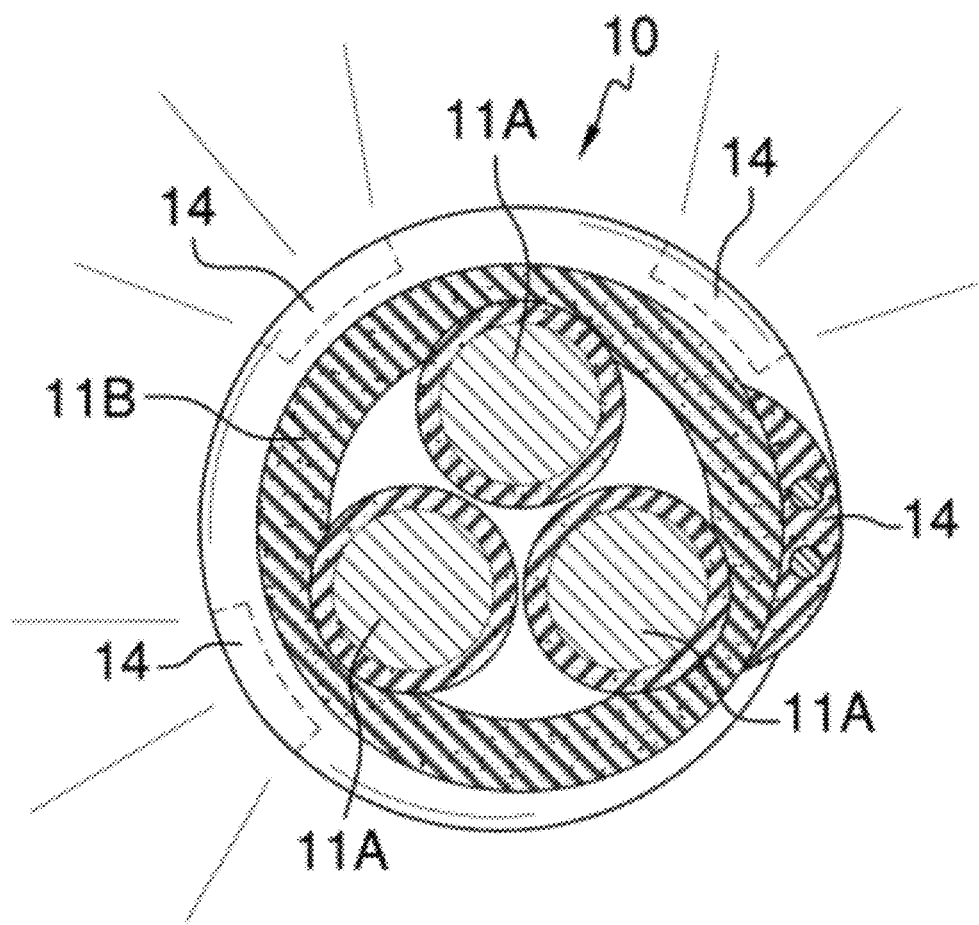
FIG. 3 illustrates a cross-sectional view of the self-illuminating extension cord along line 3-3 in FIG. 2.

Detailed reference will now be made to the preferred embodiment of the present invention, examples of which are illustrated in FIGS. 1-3 and 6. A self-illuminating extension cord 10 (hereinafter invention) includes an extension cord 11 of an undefined length and having a female plug 12, a male plug 13, and a plurality of lights 14.

The plurality of lights 14 run the length of the extension cord 11 in a spiraling pattern so as to provide an illuminating effect to the presence of the invention 10. The plurality of lights 14 receive electrical power from the male plug 13. The lights 14 attach via an attaching means to an exterior surface of the extension cord 11. The attaching means comprises adhesive or molding of the two components together.

The plurality of lights 14 may be composed of a plurality of incandescent bulbs, a plurality of light emitting diodes (hereinafter LED), or a plurality of fiber optic strings, as depicted in FIG, 6. It may also be asserted that the lights 14 may emit different colors or a single color.

The extension cord 11 is composed of a plurality of individual wires 11A that run the length of the extension cord 11, as well as an outer sheathing 11B. The extension cord 11 plugs into a standard wall outlet 30 in a manner typical of all extension cords.

Figure 4:
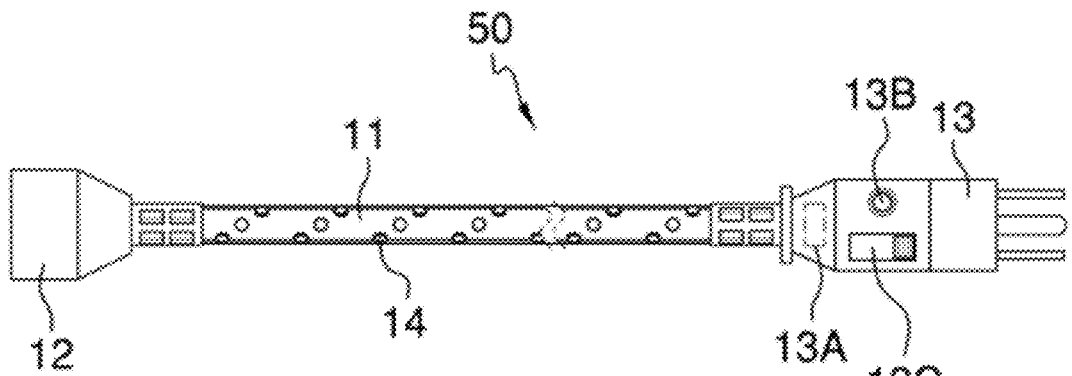
FIG. 4 illustrates a side view of an alternative embodiment wherein the male plug end of the extension cord includes a pilot light, an on/off switch, and a breaker being depicted in hidden lines.
Figure 5:
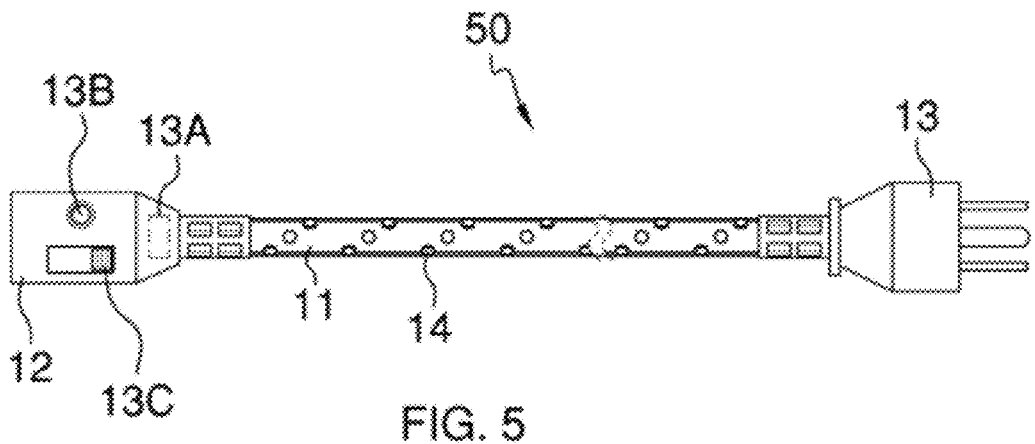
FIG. 5 illustrates a side view of an alternative embodiment wherein the female plug end of the extension cord includes a pilot light, an on/off switch, and a breaker being depicted in hidden lines.
Figure 6:
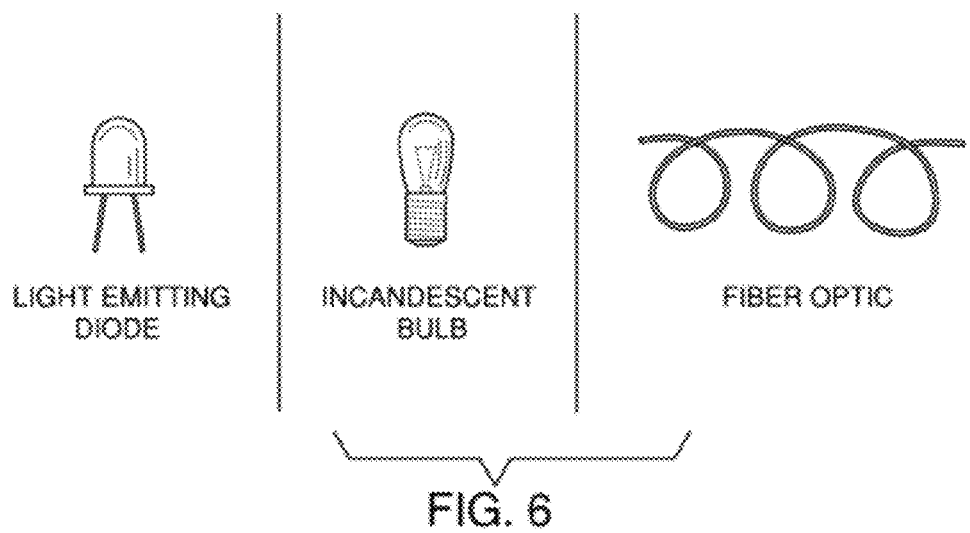
FIG. 6 illustrates a view of the various lighting means comprising light emitting diodes, incandescent bulbs, and fiber optics.

Referring to FIGS. 4 and 5, an alternative embodiment 50 includes in addition to the features and components described above for the invention 10. In FIG. 4 a male plug 13 including a breaker 13A, a pilot light 13B, and a switch 13C. The breaker 13A enables pre-defined electrical current levels to set off the breaker in order to prevent electrical surges. The pilot light 13B provides a visual warning that electrical current is present in the extension cord 11. The switch 13C provides a means of turning on or off the plurality of lights 14. It shall be noted that the switch 13C may also provide a flashing function for the plurality of lights 14. In FIG. 5, the female plug 12 includes the breaker 13A, the pilot light 13B, and the switch 13C.

Figure 7:
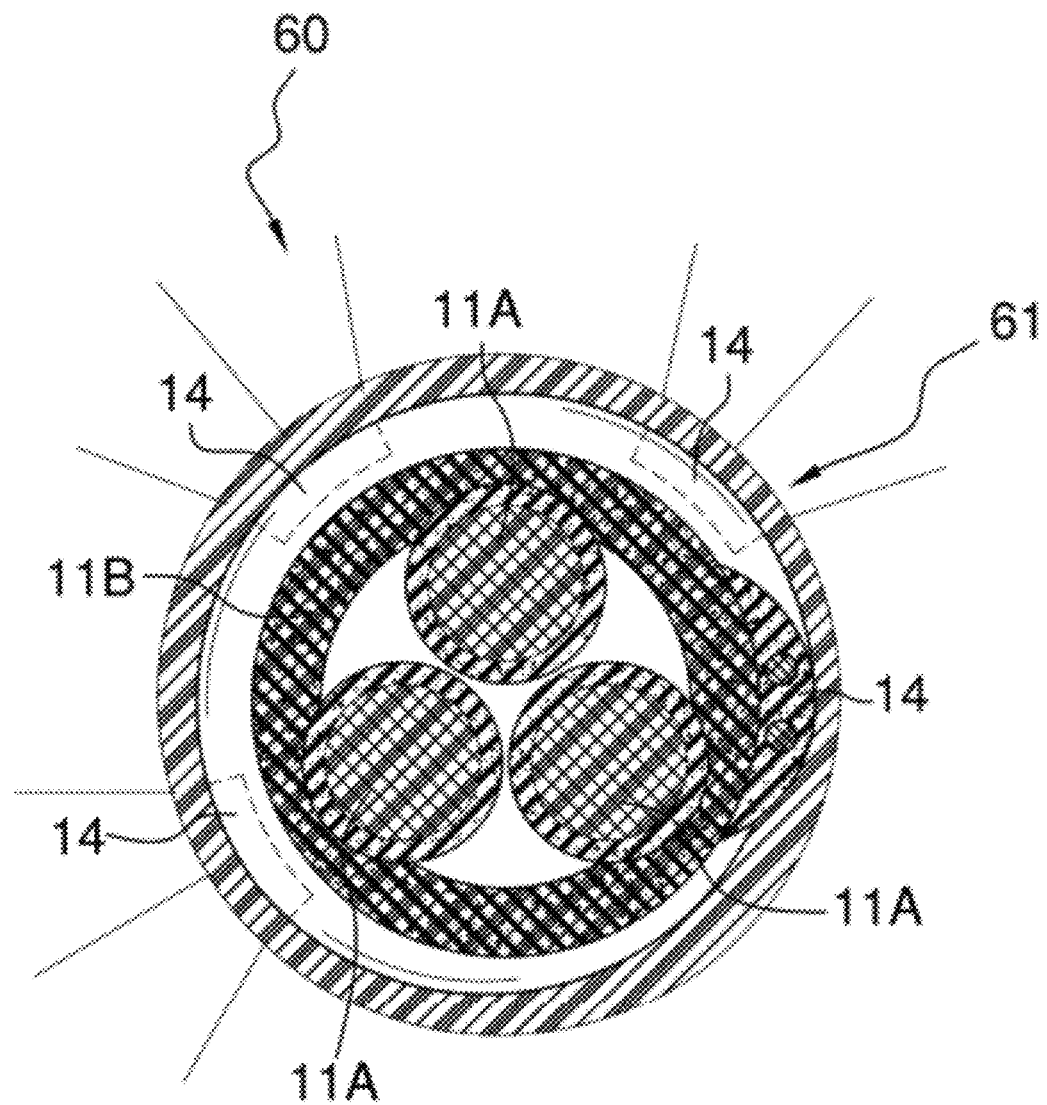
FIG. 7 illustrates a cross-sectional view of an alternative embodiment wherein both the extension cord and the plurality of lights are encased within a translucent outer protective covering.

Referring to FIG. 7, a third embodiment 60 includes the features of the invention 10 with an additional translucent protective outer coating 61 that encases both the plurality of lights 14 and the extension cord 11.

Figure 8:
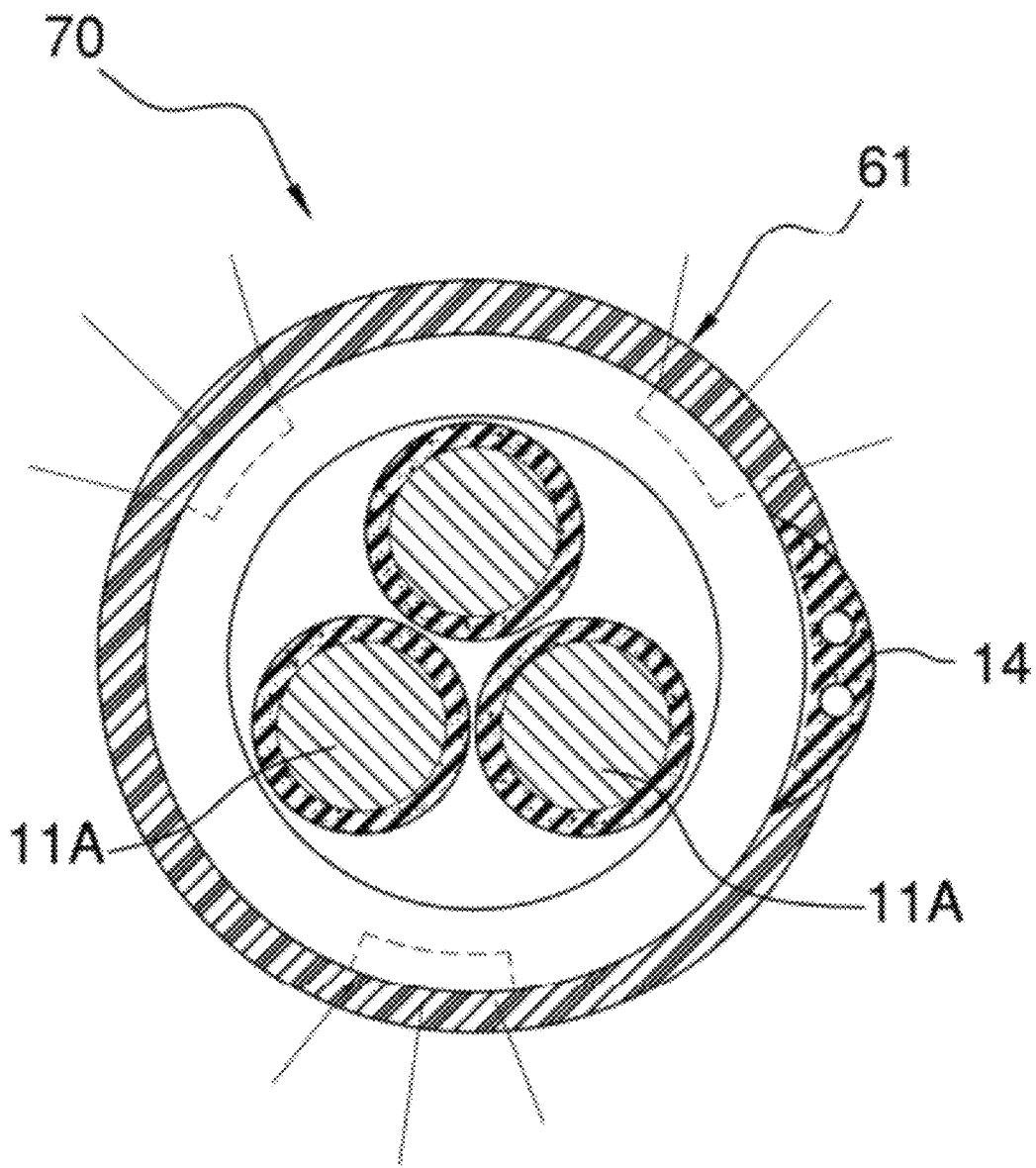
FIG. 8 illustrates a cross-sectional view of another alternative embodiment wherein the extension cord does not provide a protective layer, but includes a plurality of wires that have the plurality of lights spiraling directly around said wires, and of which all are encased within a translucent outer protective covering.
Figure 9:
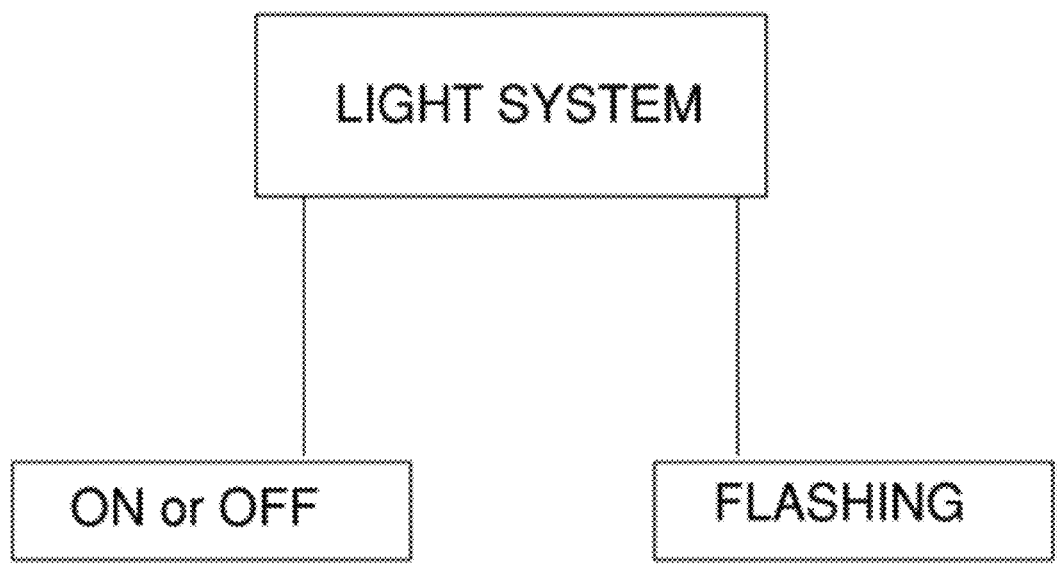
FIG. 9 illustrates a diagram relating the light system including an on/off function in addition to a flashing function.

Referring to FIG. 8, a fourth embodiment 70 includes the features of the third embodiment 60 with the exception that the extension cord 11 is without the outer sheathing 11B. The plurality of lights 14 simply spiral around the individual wires 11A directly, and all of which are encased by the translucent protective outer coating 61.

With respect to the above description, it is to be realized that the optimum dimensional relationship for the various components of the invention 10, the alternative embodiment 50, the third embodiment 60, and the fourth embodiment 70, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10, the alternative embodiment 50, the third embodiment 60, and the fourth embodiment 70.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A self-illuminating extension cord consisting of:
   an extension cord including a plurality of electrical wires, and further including a female plug and a male plug;
   wherein a plurality of lights adorn the exterior of said extension cord in order to illuminate the extension cord, and wherein said lights draw electrical current from the male plug;
   wherein the plurality of lights form a spiraling pattern that runs the length of the extension cord;
   wherein the electrical wires are encased within a sheathing from which the plurality of lights attach via an attaching means;
   wherein the wires and the sheathing and the lights are encases within a translucent protective outer covering;
   wherein the lights collectively emit a single color or a plurality of colors.

2. The self-illuminating extension cord as described in claim 1 wherein the attaching means consists of adhesive or molding the two components together.

3. The self-illuminating extension cord as described in claim 1 wherein the lights are of a type comprising incandescent bulbs, light emitting diodes, or fiber optic strings.

4. A self-illuminating extension cord consisting of:
an extension cord including a plurality of electrical wires contained within an outer sheathing, and further including a female plug and a male plug;
wherein a plurality of lights adorn the exterior of said extension cord in order to illuminate the extension cord, and wherein said lights draw electrical current from the male plug;
wherein located on the male plug is a breaker;
wherein the plurality of lights form a spiraling pattern that runs the length of the extension cord;
wherein the lights attach to the sheathing via an attaching means;
wherein the lights collectively emit a single color or a plurality of colors;
wherein the male plug further includes a pilot light to indicate the presence of electrical current within said extension cord;
wherein the male plug further includes a switch that turns the lights on or off.

5. The self-illuminating extension cord as described in claim 4 wherein the attaching means comprises adhesive or molding the two components together.

6. The self-illuminating extension cord as described in claim 4 wherein the lights are of a type comprising incandescent bulbs, light emitting diodes, or fiber optic strings.

7. The self-illuminating extension cord as described in claim 4 wherein the switch flash the plurality of lights.

8. A self-illuminating extension cord consisting of:
an extension cord inclusive of a plurality of electrical wires contained within an outer sheathing, and further including a female plug and a male plug;
wherein a plurality of lights adorn the exterior of said extension cord in order to illuminate the extension cord, and wherein said lights draw electrical current from the male plug;
wherein the lights attach to the sheathing via an attaching means,
wherein the plurality of lights form a spiraling pattern that runs the length of the extension cord;
wherein the lights collectively emit a single color or a plurality of colors;
wherein the female plug further includes a pilot light to indicate the presence of electrical current within said extension cord;
wherein located on the female plug is a breaker;
wherein the female plug further includes a switch that turns the lights on or off.

9. The self-illuminating extension cord as described in claim 8 wherein the attaching means comprises adhesive or molding the two components together.

10. The self-illuminating extension cord as described in claim 8 wherein the lights are of a type comprising incandescent, bulbs, light emitting diodes, or fiber optic strings.

11. The self-illuminating extension cord as described in claim 8 wherein the switch flash the plurality of lights.

\* \* \* \* \*